(12) United States Patent
Günther et al.

(10) Patent No.: US 12,221,163 B2
(45) Date of Patent: Feb. 11, 2025

(54) ASSEMBLY FOR A VEHICLE

(71) Applicant: Kirchhoff Automotive Deutschland GmbH, Attendorn (DE)

(72) Inventors: Alexander Günther, Olpe (DE);
Dominik Tentscher, Hemer (DE);
Antonio Turco, Sundern (DE); Michael Weige, Finnentrop (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 145 days.

(21) Appl. No.: 17/914,465

(22) PCT Filed: May 4, 2021

(86) PCT No.: PCT/EP2021/061750
§ 371 (c)(1),
(2) Date: Sep. 26, 2022

(87) PCT Pub. No.: WO2021/224275
PCT Pub. Date: Nov. 11, 2021

(65) Prior Publication Data
US 2023/0123267 A1    Apr. 20, 2023

(30) Foreign Application Priority Data

May 5, 2020    (DE) .................... 10 2020 112 131.8

(51) Int. Cl.
*B62D 25/14*    (2006.01)
*B60K 35/60*    (2024.01)
(Continued)

(52) U.S. Cl.
CPC ............ *B62D 25/145* (2013.01); *B60K 35/60* (2024.01); *B60K 35/22* (2024.01); *B60K 35/50* (2024.01);
(Continued)

(58) Field of Classification Search
CPC ........ B60K 35/22; B60K 35/60; B60K 35/70; B60K 37/10; B62D 25/14; B62D 25/145
(Continued)

(56) References Cited

U.S. PATENT DOCUMENTS 6,517,114 B1 * 2/2003 Scheib ................. B62D 25/145
                                                    296/203.02
6,648,402 B2 * 11/2003 Scheib ................. B62D 25/142
                                                    296/72

(Continued)

FOREIGN PATENT DOCUMENTS

DE    102016004156 A1    9/2016
DE    102019113312 A1    12/2019
(Continued)

OTHER PUBLICATIONS

Pending U.S. Appl. No. 17/912,589, filed Sep. 19, 2022, inventor Lagin, applicant Kirchhoff Automotive Deutschland GmbH [Per MPEP 609.07].

(Continued)

*Primary Examiner* — Jason S Daniels
(74) *Attorney, Agent, or Firm* — Polson Intellectual Property Law P.C.; Margaret Polson; Christopher Sylvain

(57) ABSTRACT

An assembly for a vehicle comprising a crossmember for connecting to two vehicle pillars, a mounting connected to the crossmember and radially protruding therefrom, and a panel-shaped instrument. The mounting has two mounts, which are mutually spaced in the y direction, and end-face connection means. The instrument is connected to the connection means of the mounting at a distance to the upper closure thereof and held such that its operating surface faces the passenger compartment. Each mount has a respective upper and lower cord. Each cord has limbs adjoining one another at an angle. The cords are inclined relative to each other so as to have a greater distance to each other at the (Continued)

instrument connection side than at the side facing the crossmember. At least one of the two cords has at least one predetermined bending point between the two connection points of the cord.

16 Claims, 3 Drawing Sheets

(51) Int. Cl.
  *B60K 35/22* (2024.01)
  *B60K 35/50* (2024.01)
  *B60K 37/10* (2024.01)
(52) U.S. Cl.
  CPC ........ *B60K 37/10* (2024.01); *B60K 2360/652* (2024.01); *B60K 2360/816* (2024.01)
(58) Field of Classification Search
  USPC .............................. 296/70, 187.03, 193.02
  See application file for complete search history.

(56) References Cited

U.S. PATENT DOCUMENTS

| | | | |
|---|---|---|---|
| 8,950,794 | B2 | 2/2015 | Lenkenhoff |
| 9,409,606 | B2 | 8/2016 | Eshima |
| 9,446,799 | B2 | 9/2016 | Franzpötter |
| 9,598,100 | B2 | 3/2017 | Lenkenhoff |
| 9,764,764 | B2 | 9/2017 | Irle |
| 10,005,495 | B2 | 6/2018 | Töller |
| 10,577,025 | B2 | 3/2020 | Michler |
| 10,882,559 | B2 | 1/2021 | Gündogan |
| 11,142,248 | B2 | 10/2021 | Günther |
| 11,148,623 | B2 | 10/2021 | Günther |
| 11,235,720 | B2 | 2/2022 | Höning |
| 11,292,409 | B2 | 4/2022 | Töller |
| 11,505,146 | B2 | 11/2022 | Weige |
| 11,724,748 | B2 * | 8/2023 | Richardson .......... B62D 25/145 296/193.02 |
| 2002/0024236 | A1 * | 2/2002 | Scheib ................ B60H 1/0055 296/203.02 |
| 2004/0212220 | A1 | 10/2004 | Riley |
| 2019/0344385 | A1 | 11/2019 | Töller |
| 2022/0009435 | A1 | 1/2022 | Günther |
| 2022/0024399 | A1 | 1/2022 | Tlauka |
| 2022/0258684 | A1 | 8/2022 | Günther |
| 2022/0281532 | A1 | 9/2022 | Tentscher |
| 2022/0289304 | A1 | 9/2022 | Weige |
| 2022/0297524 | A1 | 9/2022 | Gënther |
| 2022/0314912 | A1 | 10/2022 | Töller |
| 2022/0363211 | A1 | 11/2022 | Gënther |
| 2023/0039843 | A1 | 2/2023 | Gündogan |

FOREIGN PATENT DOCUMENTS

| | | |
|---|---|---|
| DE | 202020100757 U1 | 2/2020 |
| EP | 2740628 B1 | 1/2018 |
| EP | 3045340 B1 | 2/2019 |
| JP | 2008290508 A | 12/2008 |
| JP | 2013082362 A | 5/2013 |
| WO | 2019231459 A1 | 12/2019 |

OTHER PUBLICATIONS

Pending U.S. Appl. No. 17/915,057, filed Sep. 27, 2022, inventors Gunther et al., applicant Kirchhoff Automotive Deutschland GmbH [Per MPEP 609.07].

Pending U.S. Appl. No. 18/008,284, filed Dec. 5, 2022, inventors Gunther et al., applicant Kirchhoff Automotive Deutschland GmbH [Per MPEP 609.07].

International Search Report dated Sep. 14, 2021 in parent international application PCT/EP2021/061750.

Written Opinion of the International Searching Authority dated Sep. 14, 2021 in parent international application PCT/EP2021/061750.

* cited by examiner

ASSEMBLY FOR A VEHICLE

BACKGROUND

The present disclosure relates to an assembly for a vehicle, comprising a crossmember, which is provided for connecting to two pillars lying opposite each other with respect to the x-y plane of the vehicle; a mounting that is connected to the crossmember, protrudes therefrom in the radial direction, and has two mounts, which are mutually spaced in the y direction, and end-face connection means; and a panel-shaped instrument, in particular a display, which is connected to the connection means of the mounting at a distance to the upper closure thereof and which is mounted such that the operating surface of the instrument faces the passenger compartment of the vehicle in the x direction.

Increasingly larger display and control units—displays—are being installed in motor vehicles. These are panel-shaped instruments. In many cases, these are located as a central display approximately in the middle in the region of the dashboard. These displays are oriented with their display interface or user interface into the passenger compartment of the vehicle so that the driver and front passenger can read the information located thereon. In most cases, such displays are also provided as an input unit. They are then touch sensitive. Because of the size of the displays, the limited space available in many cases, and also for reasons of comfort and ergonomics, such displays cannot always be installed in an integrated manner in the dashboard panel, but protrude beyond the upper end of the dashboard. Designs are also known in which displays of this type that protrude beyond the dashboard in the use position can be lowered.

Panel-shaped instruments of this type, especially if they protrude completely or partially over the upper end of the dashboard, are to be mounted in such a way that they do not increase the risk of injury to the vehicle occupants in the event of an accident. For this purpose, it has been proposed in EP 3 045 340 B1 that such a display be arranged on a support element that extends on the rear side with respect to the display. The support element is embodied as angled. The display is connected to the limb extending in the vertical direction (y-z direction). On the outside with respect to the angled configuration, the two limbs are connected by a metallic connecting plate formed from metallic leaf spring material. The support element is designed so that when a load exceeding a certain force is applied to the upper region of the display, the support element breaks and the display folds over in the direction of travel. In the case of such panel-shaped instruments, at least one section of which protrudes from the surface of the dashboard, it also has to be ensured that the mounting withstands without damage a load that acts on it, for example when a person grasps the top of the display to help lift themselves up, therefore uses it as a handle, and pulls themselves up thereon. Such cases of stress, also referred to as misuse, cannot result in damage or destruction of the mounting.

A mounting arrangement of a display device for a motor vehicle interior is known from DE 10 2016 004 156 A1. In this mounting arrangement, the display device is located in front of the steering wheel. The display device is released from its mounting arrangement when the steering column is adjusted upwards as a result of an accident. As a result of this steering column movement, the display device is released from the mounting and, since it is no longer connected to a buttress, no longer poses a risk of injury.

Another mounting for a display in a motor vehicle is known from JP 2008-290508 A. This mounting comprises two individual mounts which are arranged at a distance from one another and which are connected at one end to the dashboard crossmember. The mounts protrude upwards from the dashboard crossmember in the z direction. This is considered necessary in order to be able to provide sufficient energy absorption in the available installation space. In addition to a limb extending in the z direction, one end of which is connected to the crossmember, such a mount includes a V-shaped mount part formed at an angle thereon, as a result of which this section of the mount is made N-shaped in a side view. An audio unit that is integrated in the dashboard is connected to the shorter, parallel mount limb, which also extends in the z direction. As a result of this design of the mounts, the distance between the two limbs extending in the z direction is reduced when a force acts on the audio unit in the x direction. The accompanying deformation work absorbs energy. In order to maintain a vertical alignment of the audio unit connected thereon even in case of deformation, a predetermined bending point is incorporated by weakening the material between the connection of the limb of the mount carrying it and the inclined connecting web. This mount is used to mount an audio system that does not protrude over the top of the dashboard. Therefore, this mounting does not have to meet the requirements that are placed on a display projecting over the surface of the dashboard.

Moreover, a multipart mounting device is disclosed in JP 2013-082362 A, which consists of three mounts arranged adjacent to one another on the display and three mounts which can be coupled thereto and are arranged on the dashboard crossmember.

According to the legal requirement for the mounting of such a panel-shaped instrument, such as a display, such a mounting has to be designed to be soft enough so that the maximum permissible acceleration acting on the head of an occupant is not exceeded. On the other hand, such a mount has to meet the misuse requirements without the mount being plastically deformed or destroyed. Approximately 300 N are assumed as misuse forces, wherein above all forces in the x direction (both directions) and in the z direction (directed downwards) are relevant.

SUMMARY

Proceeding from this background, one aspect of the present disclosure is based on refining an assembly for a vehicle of the type mentioned at the outset in such a way that it not only meets the requirements for occupant safety, but is also suitable for carrying panel-shaped instruments, such as displays, which are arranged at least with a section above the top of the dashboard, and thus also meets the misuse requirements, but which can also be used in cramped installation conditions.

This is achieved by an assembly of the type mentioned at the outset, in which the two mounts are designed as support structure mounts, each with an upper cord and a lower cord, which two cords each have two limbs that adjoin each other at an angle, one of which is in the y-z plane and the other in the x-y plane, and are arranged inclined relative to each other so that they are at a greater distance from each other on the instrument connection side than at their end facing the crossmember and that at least one of the two cords between its two connection points has at least one predetermined bending point provided by its geometry at which this cord bends in the z and/or y direction in the event of a load (x direction).

The directional or plane orientation (x,y,z) used in the context of this disclosure is that typically used in vehicles. Accordingly, the x direction corresponds to the longitudinal extension of the vehicle, the y direction to the transverse direction thereto, and the z direction to the vertical direction. In the case of the planes referred to in conjunction with the spatial position of the limbs of the two cords—the y-z plane and the x-z plane—these are not to be understood strictly geometrically. Rather, the spatial position can deviate from the strictly geometrical plane as long as the projection of the actual spatial position (ACTUAL spatial position) into the strictly geometrical plane maps the larger part of the actual spatial position. The deviation is preferably not greater than ±40°. The same applies to the direction specifications.

The two mounts in this assembly are designed as support structure mounts. These therefore each have an upper cord and a lower cord. The two cords are each formed by two limbs adjoining one another at an angle, typically at right angles or at least approximately at right angles. One of the two limbs of the cords is in the y-z plane and the other in the x-y plane.

According to one embodiment, the limbs of the two cords located in the y-z plane are designed facing towards one another. The two cords of such a mount are arranged inclined relative to one another, wherein they are at a greater distance from one another on the instrument connection side than at their end facing towards the crossmember. Therefore, the connection side of the mount, to which the panel-shaped instrument, typically designed as a display, is connected, has a greater extension in the z direction than at its end, using which such a mount is connected to the dashboard crossmember. In order to ensure an adjustment of the display in case of an acceleration acting thereon and exceeding a certain level by bending of at least one of the two cords at a defined point, this at least one cord that bends in such a case has a predetermined bending point. This is designed so that in the event of an accident-related load acting on the upper end of the display (load direction in the x direction), this cord bends in the z direction and/or in the y direction. The bending direction of this cord thus extends in a transverse direction to the acceleration acting thereon in the event of an accident.

In this mount, the force acting on each mount is coupled into the two cords spaced apart from one another, which mounts protrude from the crossmember in the x direction. As a result, the crossmember, which is a stable component in any case, represents the buttress against which an acceleration acting on the display, which is to be absorbed by bending, results in the desired adjustment thereof. The upper end of the panel-shaped instrument is located spaced apart from the upper cord of the mount in the z direction. If the display is located as far as possible from the top of the dashboard with respect to its height, the mounts will be connected to the lower region of the display. Acceleration acting on the display, typically caused by the striking of the head of a vehicle occupant in case of an accident, results in bending stress in the upper cord due to the cords converging in the direction of the crossmember, so that it bends at the provided predetermined bending point when the corresponding force is applied. It is therefore provided in one preferred example embodiment that at least the upper cord of each mount has such a predetermined bending point. When such a force acts on the display, the connection thereof to the lower cord acts like a hinge with a tensile stress coupled into the lower cord. The predetermined bending point is provided by the geometry of the cord in the region of the predetermined bending point. If the upper cord is supposed to bend in the z direction, therefore around a bending axis extending in the y direction, this can be adjusted via the height of the cord in the z direction and therefore via the design of its limb located in the y-z plane. The bending direction will also be specified by the geometry here. Bending of the upper cord is supposed to occur upwards in the z direction. For this purpose, the upper cord has a concave shape in the region of the predetermined bending point, wherein the height of the limb located in the y-z plane is least in the region of the apex of this shaped structure. It is of interest that such a geometric specification for providing the predetermined bending point reacts in the event of a load with a corresponding acceleration or force acting thereon, but not when there is a force acting thereon, which can primarily be applied as a tensile force, but also as a compressive force, in the case of a misuse, for example, when an occupant grasps the top edge of the display to stand up thereon. Due to the special geometry of the mounts, in the event of an acceleration acting on the panel-shaped instrument in the event of an accident, they react with a corresponding energy absorption and thus cause a deceleration, by which serious injuries are avoided.

If a flexibility in the case of an accident is also to be provided when an acceleration or force acts on the panel-shaped instrument, which is coupled into both cords, it is provided that the cords additionally have a predetermined bending point at which the cord sections closer to the display with respect to the predetermined bending point bend in or out in the y direction in relation to the cord sections located on the other side with respect to the predetermined bending point. This can be achieved by a flexure in the two cords, by which the two cord sections separated by the flexure are offset in relation to one another in the alignment of their longitudinal extension in the y direction and the cord sections offset by the flexure do not overlap in their alignment in the y direction. In the event of a load acting on such a mount in the x direction in the direction of the crossmember, the flexure acts as a hinge. The axis of the flexure typically extends in the z direction. In such an embodiment, the cord section carrying the connection means can be inclined counter to the offset direction of the flexure, due to which this cord section has a certain specification for activating the predetermined bending point. Depending on the design of the mount, angles of inclination between 7 and 11° are sufficient. The other respective cord section does not necessarily have to have such a specification. The flexure is preferably located outside the center of the longitudinal extension of the cords, specifically offset in the direction towards the connection of the mount to the crossmember. The cord section carrying the panel-shaped instrument is then longer and acts on the predetermined bending point with a correspondingly longer lever. Thus, the reaction of the predetermined bending point can also be influenced via the length of this cord section.

The design of such a mount is expedient if the two cords already converge before they are connected to the crossmember, in that the limbs located in the x-z plane are brought together and the other two limbs of the two cords are thus connected to one another by a common web. This section, which is adjacent to the crossmember with regard to the connection of the mounts, has a higher flexural rigidity than the section in which the two cords are spaced apart from one another. In this way, the bending buttress is displaced away from the crossmember in the direction of the predetermined bending point.

The design of the cords having their limbs adjoining at an angle and the recess located between the cords allows individual adaptation to different requirements, since the rigidity or bending behavior can be easily influenced by the respective limb height or limb width. Other measures for influencing the bending behavior, such as a different material thickness, the formation of a different metal structure, and the like are also possible.

It is also to be emphasized in the case of this mounting that it exclusively has to be connected to the dashboard crossmember. This is also the case in one preferred example embodiment. This mounting is therefore suitable for forming an assembly of the type mentioned, in which only relatively little installation space is available.

Typically, the ends of the two cords on the connection means side are also connected to one another by a web.

BRIEF DESCRIPTION OF THE DRAWINGS

The present disclosure is described hereinafter on the basis of an example embodiment with reference to the appended figures, wherein.

DETAILED DESCRIPTION

Figure 1:
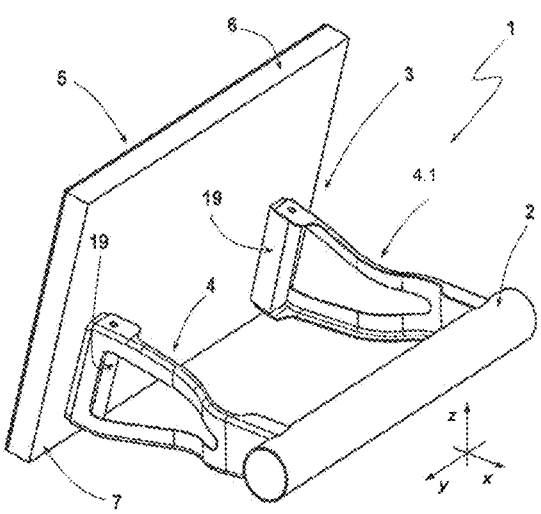
FIG. 1 shows a perspective view of an assembly for a vehicle comprising a crossmember and a display connected thereon by means of a mounting.

An assembly 1 for a vehicle comprises a dashboard crossmember 2, only a portion of which is shown in FIG. 1. For the sake of simplicity, the crossmember 2 is embodied as a tube in the figure. It can also have other cross-sectional geometries, and can also be assembled from, for example, two shells to create the hollow chamber profile desired for such a crossmember. In addition to the crossmember 2, the assembly 1 includes a mounting 3. This has two mounts 4, 4.1. The two mounts 4, 4.1 are formed mirror-symmetrical to the y-z plane. The mounts 4, 4.1 are connected at one end to the crossmember 2, specifically by a welded bond. The welded bond follows the contour of the mount 4, 4.1 on the outside. Both the crossmember 2 and the mounts 4, 4.1 are steel parts. The mounts 4, 4.1 are arranged at a distance from one another in the y direction. At their end opposite the crossmember 2, the mounts 4, 4.1 of the mounting 3 are connected to the rear side of a display 5 as an example of a panel-shaped instrument. As can be seen in FIG. 1, the mounts 4, 4.1 are connected to the display 5 in its lower half at a small distance from the lower end. The display 5 is thus connected to the mounting 3 off-center in the vertical direction (z direction). The distance of the mounts 4, 4.1 in the z direction from the upper end 6 of the display 5 is significantly greater than the distance of the mounts 4, 4.1 from its lower end 7.

As explained below with reference to the mount 4, the mounts 4, 4.1 have predetermined bending points so that when an acceleration acts on the upper end 6 of the display 5, for example due to the impact of the head of an occupant, the display 5 bends with its upper end 6 in the direction of the crossmember 2 to avoid or reduce a risk of injury. If an impact on the display 5 from the direction of the passenger compartment, in which its user interface faces, acts less as a tilting load, which couples a bending moment into the respective mount, but more as a load in the x direction over the height of the display 5, the mounts 4, 4.1 bend, due to which the distance between the display 5 and the crossmember 2 is reduced. The mounts 4, 4.1 are thus used for energy absorption and are designed so that they do not break in case of bending.

The mounts 4, 4.1 are spaced apart relatively far apart from one another in the y direction with respect to the extension of the display 5 in this direction and are only connected to the lateral end of the display 5 facing in the y direction at a small distance from this lateral end. The mounts 4, 4.1 protrude from the crossmember 2 in the x direction.

The following explanations, in which the mount 4 is described, apply equally to the mount 4.1, which is mirror-symmetrical to the mount 4.

Figure 5:
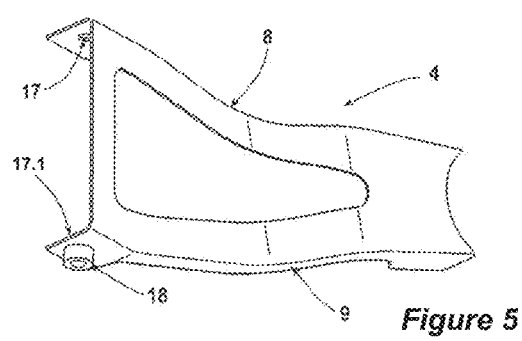
FIG. 5 shows a perspective view of the mount of the preceding figures from a different perspective.

The mount 4 is designed like a supporting structure and has an upper cord 8 and a lower cord 9 spaced apart therefrom in the z direction. The distance of the cords 8, 9 is reduced from the connection side 10 to which the display 5 is connected, in the direction of its crossmember connection 11. As can be seen from the perspective view of the mount 4 on its inside in FIG. 4, each cord consists of two limbs 12, 12.1; 13, 13.1 arranged at right angles to one another. The limbs 12, 12.1 are in the x-y plane. The limbs 13, 13.1 are in the y-z plane. The limbs 13, 13.1 of the two cords 8, 9 face one another and delimit a recess 14. The recess 14 is delimited next to the limbs 13, 13.1 in the region of the connection side 10 by a web 15 connecting the limbs 13, 13.1. On its side facing the crossmember 2, the recess 14 is delimited by the convergence of the webs 13, 13.1 while forming a web 16 connecting the cords 8, 9. The limbs 12, 13; 12.1, 13.1 adjoin one another at right angles to form a radius. The radius is a result of the production process of the mount 4, which is manufactured as a stamped and bent part produced from a steel plate. The horizontally lying limbs 12, 12.1 are widened in their end section on the connection side 10 (see FIGS. 3 and 4) so that they can be equipped with connecting means in order to be able to connect the display 5 thereon. In the example embodiment shown, these connecting means are circular passages 17, 17.1 for passing through a screw fastener (not shown in the figures). As can be seen from FIG. 5, a press-in nut 18 is connected to the lower side of the relevant widening of the limb 12.1 of the lower cord 9, in the internal thread of which a screw fastener can be fixed, wherein the shaft thereof reaches through the opening 17 of the limb 12 of the upper cord 8 and a connection part 19 of the display 5.

Figure 2:
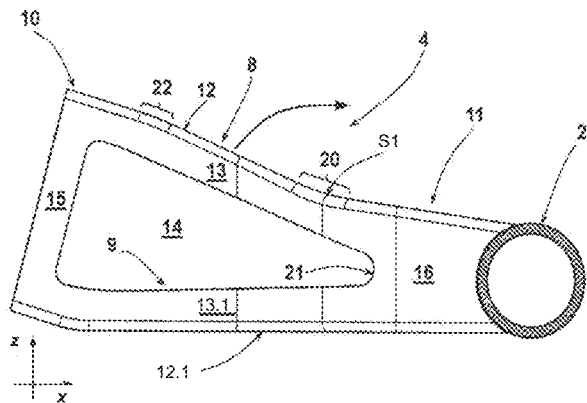
FIG. 2 shows a side view of the left mount of the mounting in FIG. 1.

The geometry of the upper cord 8 is designed so that it has a first predetermined bending point S1 through which the cord 8 bends in the z direction when an accident-related acceleration acts on the upper end 6 of the display 5, as indicated by the arrow in FIG. 2. The predetermined bending point S1 is provided by a concave section 20 of the course of its limb 12. The concave design can be seen in the side view of FIG. 2 by the height of the upper cord 8 changing in this regard. When the upper cord 8 bends, the crossmember 2 lying behind the predetermined bending point S1 in the x direction with respect to the direction of impact acts as a buttress. The higher flexural rigidity of the mount 4 in the region of its crossmember connection 11 and the convergence of the limbs 13, 13.1 to form the web 16 are also used as a buttress for the definition of the predetermined bending point S1, at which the connection-side cord section of the upper cord 8 bends in or out with respect to the other cord section for energy absorption. In order to avoid a notch effect, the edges of the limbs 13, 13.1 facing one another converge in a radius 21 in the direction of the web 16. The concave section 20 of the upper cord 8, in the apex of which the predetermined bending point S1 is located, is formed in the illustrated embodiment by a transition of the inclination of the upper cord 8 from a lesser inclination in its section comprising the crossmember connection 11 and a greater inclination in relation to a horizontal in its cord section extending from the concave section 20 to the connection side 10. The limb 12, according to the definition made at the outset, is also located in this section in the x-y plane, as used in the context of these statements. The bending axis of the predetermined bending point S1 extends in the y direction.

Adjacent to the widened section of the limb 12 carrying the passage 17, the top contour of the upper cord 8 is convexly curved in a section 22. In this respect, the limb 12 has, as can be seen from FIG. 2, a certain flexure-like course in its longitudinal extension.

Figure 3:
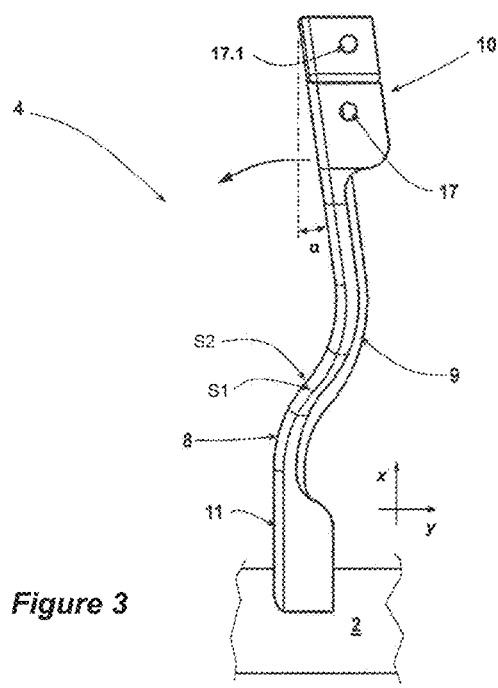
FIG. 3 shows a top view of the mount of FIG. 2.
Figure 4:
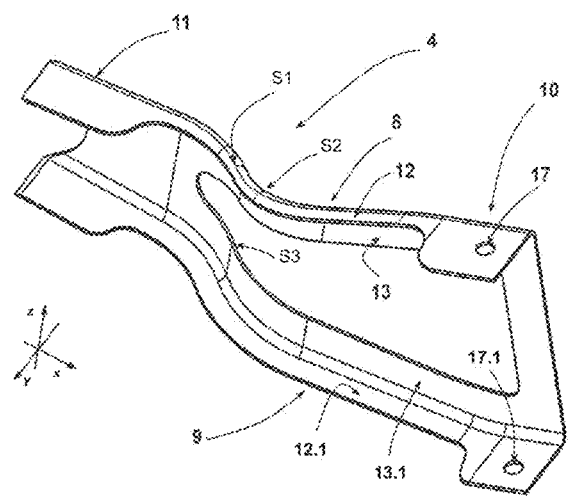
FIG. 4 shows a perspective view of the mount of the preceding figures.

As can be seen from the top view in FIG. 3, the mount 4 is curved in an S-shape in the x-y plane, as a result of which a flexure is formed. The offset of the flexure faces in the y direction. In the alignment (x direction) of the cord sections offset in relation to one another by the flexure, they do not overlap. This geometry provides a predetermined bending point S2, S3 in each of the two cords 8, 9, in which the cords 8, 9 bend in the y direction when the display 5 is subjected to a corresponding force in the x direction towards the crossmember 2. The bending axis of these predetermined bending points S2, S3 extends in the z direction (including the permitted deviation).

The crossmember connection-side cord sections adjoin the crossmember 2 at right angles in the y-z plane. The connection-side cord sections spaced apart from these cord sections by the predetermined bending points S2, S3 are inclined in relation to this connection direction, specifically in the example embodiment shown at an angle α of approximately 8.5°. This inclination, which is provided against the offset direction of the flexure, is used as a specification for activation of the predetermined bending points S2, S3 provided in the two cords 8, 9.

The mount 4 thus has predetermined bending points S1 to S3, by means of which it can bend in two directions for energy absorption.

With this concept, the forces required for bending can be adjusted to the respective vehicle-related application for example by appropriately adjusting the height of the limbs 13, 13.1, the extension of the recess 14, the specifications provided by the flexures, to name only the major influencing variables. Therefore, the mount 4, 4.1 of the mounting 3 can be adjusted very exactly to the forces to be absorbed in case of an accident. The use of two mounts 4, 4.1 also allows them to be designed differently with regard to their individual crash performance. It is obvious that the mounting as a whole has to meet the requirements for crash performance. This allows the mounts to be designed differently in order to adapt to the individual display position for each vehicle and/or the dashboard crossmember geometry.

The above-described design of the mounts 4, 4.1 of the mounting 3 makes it clear that a tensile force acting on the upper end 6 of the display 5 does not result in a deformation of the mounts 4, 4.1 or one of their cords 8 or 9, at least not with a force which is coupled into the display 5 in the event of a misuse by using the upper end 6 of the display 5 as a handle to stand up.

The mounts described in the example embodiment with reference to the figures are produced from a steel plate. It is obvious that other materials, such as aluminum alloys, can also be used instead of this material. The use of non-metallic materials is of course also possible.

The invention has been described on the basis of an example embodiment with reference to the figures. Without departing the scope of the claims, numerous further design options result for a person skilled in the art, without having to explain or show them in greater detail in the context of this disclosure.

LIST OF REFERENCE NUMERALS 1 assembly
2 dashboard crossmember
3 mounting
4, 4.1 mount
display
6 upper end
7 lower end
8 upper cord
9 lower cord
connection side
11 crossmember connection
12, 12.1 limbs
13, 13.1 limbs
14 recess
web
16 web
17, 17.1 passage
18 press-in nut
19 connection part
concave section
21 radius
22 convex section
S1-S3 predetermined bending point
α angle

The invention claimed is:

1. An assembly for a vehicle comprising:
a crossmember for connecting to two pillars lying opposite each other with respect to an x-z plane of the vehicle,
a mounting connected to the crossmember and protruding therefrom in a radial direction, the mounting comprising two mounts, which are spaced apart from one another in a y direction, and end-face connection means, and
a panel-shaped instrument connected to the connection means of the mounting at a distance from an upper end of the panel-shaped instrument, wherein the panel-shaped instrument is mounted such that a user interface of the instrument faces in an x direction into a passenger compartment of the vehicle,
wherein the two mounts are designed as support structure mounts, each mount having an upper cord and a lower cord, each of the two cords having two limbs adjoining one another at an angle, with one limb in a y-z plane and the other limb in an x-y plane, wherein the two cords are arranged inclined relative to one another such that the cords are at a greater distance from one another on the instrument connection side than the crossmember connection side, and wherein at least one of the two cords has, between its two connection sections, at least one predetermined bending point at which the cord bends in a z direction and/or in the y direction in the event of a load in the x direction.

2. The assembly of claim 1, wherein the limbs located in the y-z plane are each arranged facing toward the other cord.

3. The assembly of claim 1, wherein the two cords of each mount each have at least one predetermined bending point at which the cords bend in the z direction and/or y direction in the event of a load in the x direction.

4. The assembly of claim 1, wherein the two cords of each mount each have a predetermined bending point at which the cords bend in the y direction in the event of a load in the x direction.

5. The assembly of claim 4, wherein the two cords of each mount, in a projection thereof in the x-y plane, have a flexure facing in the y direction with an offset such that two cord sections offset from one another by the flexure do not overlap in the alignment of their longitudinal extension in the y direction.

6. The assembly of claim 5, wherein the cord sections of the two cords carrying the connection means for the panel-shaped instrument are inclined against an offset direction of the flexure.

7. The assembly of claim 6, wherein the angle of inclination is between 7 and 11°.

8. The assembly of claim 1, wherein, to form a predetermined bending point at which a cord bends in the z direction in the event of a load in the x direction, the cord has a section that is concave in the direction of its longitudinal extension with an apex axis which extends in the y direction.

9. The assembly of claim 1, wherein, due to the geometry in the design of the mounts, the mounts have a higher flexural rigidity at a distance from the at least one predetermined bending point in the direction of their crossmember connection than in a region of a predetermined bending point and from the direction of the connecting means in the cord section located in front of the predetermined bending point.

10. The assembly of claim 9, wherein, to increase the flexural rigidity of the cords, the limbs of the cords located in the y-z plane converge in the direction of the crossmember connection and the cords are connected to one another by a web due to the convergence of these limbs.

11. The assembly of claim 9, wherein, to increase the flexural rigidity of the cords, the limbs of the cords located in the x-y plane are provided with a greater width.

12. The assembly of claim 1, wherein the two cords of the mounts are connected to one another by a web in an end section carrying the connection means.

13. The assembly of claim 1, wherein the two cords of the mounts have a greater width in their end sections carrying the connecting means than in adjacent cord sections.

14. The assembly of claim 1, wherein the limbs of the lower cords located in the x-y plane each carry a press-in nut on an outside thereof as connection means for fixing a fastening bolt, and a shaft of the fastening bolt extends through a passage in the limb of the upper cord located in the x-y plane and a connecting part of the panel-shaped instrument arranged between the limbs of the upper and lower cords located in the x-y plane.

15. The assembly of claim 1, wherein the mounts are produced as stamped and bent parts from a steel plate.

16. The assembly of claim 1, wherein the panel-shaped instrument is a display.

* * * * *